(12) United States Patent
Inagaki et al.

(10) Patent No.: US 10,626,952 B2
(45) Date of Patent: Apr. 21, 2020

(54) TORSIONAL VIBRATION REDUCING DEVICE

(71) Applicant: TOYOTA JIDOSHA KABUSHIKI KAISHA, Toyota-shi, Aichi (JP)

(72) Inventors: Takafumi Inagaki, Toyota (JP); Toshiya Yamashita, Toyota (JP); Takuya Okada, Toyota (JP); Atsushi Muto, Toyota (JP); Masahiro Shirakawa, Nagoya (JP); Yusuke Suzuki, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/176,218

(22) Filed: Oct. 31, 2018

(65) Prior Publication Data

US 2019/0128369 A1 May 2, 2019

(30) Foreign Application Priority Data

Nov. 1, 2017 (JP) .................................. 2017-212255

(51) Int. Cl.
*F16F 15/14* (2006.01)
*F16H 45/02* (2006.01)

(52) U.S. Cl.
CPC ........... *F16F 15/145* (2013.01); *F16H 45/02* (2013.01); *F16F 2222/08* (2013.01); *F16F 2226/02* (2013.01); *F16F 2232/02* (2013.01); *F16H 2045/0263* (2013.01)

(58) Field of Classification Search
CPC . F16F 15/145; F16H 2045/0263; F16H 45/02
See application file for complete search history.

(56) References Cited

U.S. PATENT DOCUMENTS

2016/0327118 A1* 11/2016 Miyahara .............. F16F 15/145

FOREIGN PATENT DOCUMENTS

| JP | H06-193684 A | 7/1994 | | |
|----|---|---|---|---|
| JP | 2014-206236 A | 10/2014 | | |
| JP | 2015-132338 A | 7/2015 | | |
| WO | WO-2015105099 A1 * | 7/2015 | ............ | F16F 15/145 |
| WO | WO-2015198120 A1 * | 12/2015 | ............ | F16F 15/145 |

* cited by examiner

*Primary Examiner* — Luis A Gonzalez
(74) *Attorney, Agent, or Firm* — Oliff PLC

(57) ABSTRACT

In a torsional vibration reducing device, a protrusion projecting radially outward of the rotating body is formed on an inner wall surface. The protrusion is formed on a rotation direction side of a rotating body relative to a straight line passing through a rotation center of the rotating body and a center of a rolling element when the rolling element is located in a middle between both end positions to which the rolling element swings within the roller chamber, and while the rolling element is located at an end portion of a roller chamber on the rotation direction side of the rotating body, a gap is equal to or less than a predetermined value between the rolling element and a wall surface of the roller chamber on a straight line passing through a rotation center of the rotating body and a tip of the protrusion.

4 Claims, 3 Drawing Sheets

TORSIONAL VIBRATION REDUCING DEVICE

This application claims priority from Japanese Patent Application No. 2017-212255 filed on Nov. 1, 2017, the disclosure of which is herein incorporated by reference in its entirety.

BACKGROUND OF THE INVENTION

Field of the Invention

The present invention relates to a structure of a torsional vibration reducing device reducing torque variation.

Description of the Related Art

There is known a torsional vibration reducing device including a rotating body rotated by receiving a torque, multiple arc-shaped roller chambers formed in a rotation direction of the rotating body, and rolling elements swingably housed in the roller chambers. This corresponds to a mechanism disposed in a flywheel main body 1 in Patent Document 1. As shown in FIG. 1 of Patent Document 1, multiple roller chambers 3 having an arc shape are formed in a disk-shaped roller chamber constituent body 2, and disk-shaped damper masses 11 are respectively housed in the roller chambers 3. As shown in FIG. 8, the roller chambers 3 are formed in an arc shape in the rotation direction of the roller chamber constituent body 2, and the damper masses 11 are swingable in the roller chambers 3.

The roller chambers 3 shown in FIG. 8 of Patent Document 1 are each formed bilaterally symmetrically relative to a straight line passing through the center of rotation of the roller chamber constituent body 2 and the center of the damper mass 11 when the damper mass 46 is located at an intermediate position between both end positions to which the damper mass 11 is swingable. On a wall surface of the roller chamber 3 on the straight line, a protrusion projecting toward the radially outer side of the roller chamber constituent body 2 is formed on an inner wall surface located on the radially inner side of the roller chamber constituent body 2, and a width (dimension) between a tip of the protrusion and an outer wall surface of the roller chamber 3 located on the radially outer side of the roller chamber constituent body 2 is approximated to the diameter of the damper mass 11.

CITATION LIST

Patent Document 1: Japanese Laid-Open Patent Publication No. 6-193684
Patent Document 2: Japanese Laid-Open Patent Publication No. 2014-206236
Patent Document 3: Japanese Laid-Open Patent Publication No. 2015-132338

SUMMARY OF THE INVENTION

Technical Problem

As described above, in Patent Document 1, the protrusion is formed on the inner wall surface of the roller chamber 3, and the width between the tip of the protrusion and the outer wall surface of the roller chamber 3 located on the radially outer side of the roller chamber constituent body 2 is approximated to the diameter of the damper mass 11, so as to suppress an abnormal noise caused by a collision between the wall surface of the roller chamber 3 and the damper mass 11; however, since the width between the tip of the protrusion and the outer wall surface is approximated to the diameter of the damper mass 11, the protrusion has a smaller tip angle. At the time of manufacturing, a heat treatment is performed to give the protrusion a hardness capable of withstanding a collision load of the rolling element, and the smaller tip angle of the protrusion may cause cracking during the heat treatment.

The present invention was conceived in view of the situations and it is therefore an object of the present invention to provide a torsional vibration reducing device capable of suppressing an abnormal noise occurring due to collision of a rolling element with a wall surface of a roller chamber and capable of reducing cracking of a protrusion during a heat treatment.

Solution to Problem

To achieve the above object, a first aspect of the present invention provides a torsional vibration reducing device comprising: (a) a rotating body rotated by receiving a torque; a roller chamber formed in the rotating body and formed in a circular arc shape along a rotation direction of the rotating body; and a rolling element swingably housed in the roller chamber, wherein (b) a protrusion projecting radially outward of the rotating body is formed on an inner wall surface which is a portion of a wall surface forming the roller chamber located on the radially inner side of the rotating body, wherein (c) the protrusion is formed on the rotation direction side of the rotating body relative to a straight line passing through a rotation center of the rotating body and a center of the rolling element when the rolling element is located in the middle between both end positions to which the rolling element is swings within the roller chamber, and wherein (d) while the rolling element is located at an end portion of the roller chamber on the rotation direction side of the rotating body, a gap is equal to or less than a predetermined value between the rolling element and the wall surface of the roller chamber on a straight line passing through the rotation center of the rotating body and a tip of the protrusion.

A second aspect of the present invention provides the torsional vibration reducing device recited in the first aspect of the invention, wherein the wall surface of the roller chamber is formed in a shape conforming to an outer circumferential shape of the rolling element from an end portion on the rotation direction side of the rotating body to the straight e passing through the rotation center of the rotating body and the tip of the protrusion.

A third aspect of the present invention provides the torsional vibration reducing device recited in the first or second aspect of the invention, wherein the protrusion is subjected to a heat treatment.

Advantageous Effects of Invention

According to the torsional vibration reducing device recited in the first aspect of the invention, while the rolling element is located at the end portion of the roller chamber on the rotation direction side of the rotating body, the gap is equal to or less than the predetermined value between the rolling element and the wall surface of the roller chamber on the straight line passing through the rotation center of the rotating body and the tip of the protrusion. Therefore, for example, when an engine is stopped, the rolling element is located at the end portion of the roller chamber on the rotation direction side of the rotating body due to inertia, and in this case, since the gap between the wall surface of the roller chamber and the rolling element is equal to or less than the predetermined value, an amount of movement of the rolling element is restricted to a predetermined value or less, so that the abnormal noise due to collision between the rolling element and the wall surface of the roller chamber is suppressed.

The protrusion is formed on the rotation direction side of the rotating body relative to the straight line passing through the rotation center of the rotating body and the center of the rolling element when the rolling element is located in the middle between both end positions to which the rolling element is swings within the roller chamber, and therefore, the tip angle of the protrusion can be made larger as compared to when the protrusion is on the straight line. Therefore, the occurrence of cracking of the protrusion can be reduced during the heat treatment applied for increasing the hardness of the protrusion.

According to the torsional vibration reducing device recited in the second aspect of the invention, the wall surface of the roller chamber is formed in a shape conforming to the outer circumferential shape of the rolling element from the end portion on the rotation direction side of the rotating body to the straight line passing through the rotation center of the rotating body and the tip of the protrusion. Therefore, while the rolling element is located at the end portion of the roller chamber on the rotation direction side of the rotating body, the movement of the rolling element is restricted, so that the abnormal noise due to collision between the rolling element and the wall surface of the roller chamber is suppressed.

According to the torsional vibration reducing device recited in the third aspect of the invention, the protrusion is heat-treated, and a smaller tip angle of the protrusion may cause cracking during the heat treatment. In this regard, since the protrusion is formed on the rotation direction side of the rotating body relative to the straight line passing through the rotation center of the rotating body and the center of the rolling element when the rolling element is located in the middle between both end positions to which the rolling element is swings within the roller chamber, the tip angle of the protrusion can be made larger as compared to when the protrusion is on the straight line and it is possible to reduce the cracking of the protrusion during the heat treatment.

DESCRIPTION OF THE PREFERRED EMBODIMENTS

An example of the present invention will now be described in detail with reference to the drawings. In the following example, the figures are simplified or deformed as appropriate and portions are not necessarily precisely drawn in terms of dimension ratio, shape, etc.

Example

Figure 1:
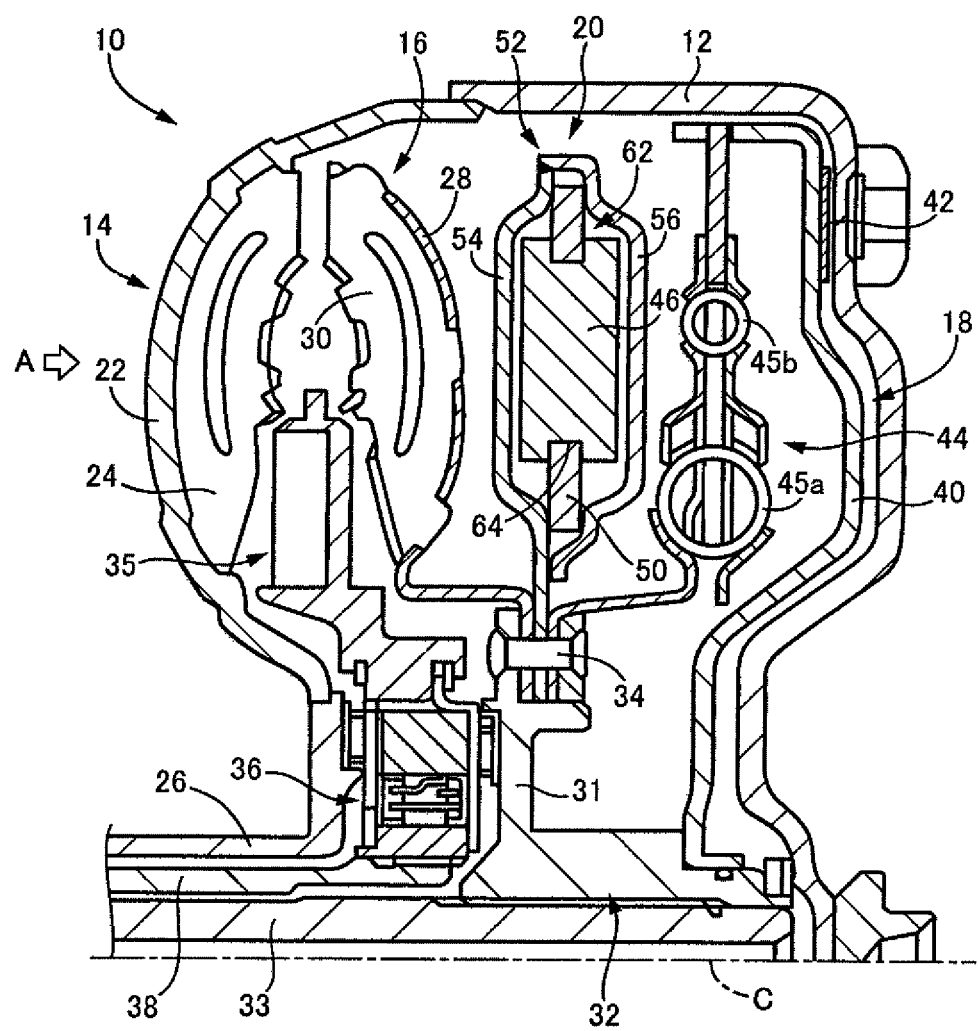
FIG. 1 is a cross-sectional view of a torque converter mounted on a vehicle to which the present invention is applied.

FIG. 1 is a cross-sectional view of a torque converter 10 mounted on a vehicle to which the present invention is applied. The torque converter 10 is a hydraulic power transmission disposed on a power transmission path between an engine and a transmission not shown to amplify and transmit torque (power) of the engine to the transmission. When the power is transmitted from the engine, the torque converter 10 is rotationally driven around an axis C.

The torque converter 10 includes a front cover 12 to which the power of the engine is input, a pump impeller 14 coupled to the front cover 12, a turbine runner 16 arranged to face the pump impeller 14 in the axis C direction, a lock-up clutch 18, and a torsional vibration reducing device 20 disposed between the turbine runner 16 and the lock-up clutch 18 in the axis C direction.

The front cover 12 is formed in a bottomed cylindrical shape and is connected to a crankshaft of the engine. The front cover 12 has an end portion on the opening side, i.e., an end portion on the outer circumferential side with regard to the axis C, coupled to an end portion of the pump impeller 14 on the outer circumferential side. The pump impeller 14 is made up of a pump shell 22 formed in an annular shape having an arc-shaped cross section and multiple pump blades 24 attached to the pump shell 22. An outer circumferential end portion of the pump shell 22 around the axis C is coupled by welding to the end portion of the front cover 12 on the outer circumferential side. An inner circumferential end portion of the pump shell 22 based on the axis C is connected to a first intermediate member 26. A hydraulic oil is sealed in a space surrounded by the front cover 12 and the pump shell 22. The first intermediate member 26 is coupled to a drive gear of an oil pump not shown, in a power transmittable manner.

The turbine runner 16 is arranged at a position facing the pump impeller 14 in the axis C direction. The turbine runner 16 is made up of a turbine shell 28 formed in an annular shape having an arc-shaped cross section and multiple turbine blades 30 attached to the turbine shell 28. The turbine shell 28 is formed in a bent manner on its inner circumferential side and has an inner circumferential end portion extending perpendicularly to the axis C. The inner circumferential end portion of the turbine shell 28 is connected to a clutch hub 32 by a rivet 34.

The clutch hub 32 is an annular member arranged rotatably around the axis C and has a flange portion 31 extending radially outward and formed on its outer circumferential surface. An inner circumferential portion of the clutch hub 32 is spline-fitted to an input shaft 33 of the transmission not shown, and the clutch hub 32 rotates integrally with the input shaft 33.

A stator 35 is arranged between the pump impeller 14 and the turbine runner 16 facing each other in the axis C direction. The stator 35 is arranged rotatably around the axis C. A blade is formed on the outer circumferential side of the stator 35. An inner circumferential portion of the stator 35 is coupled to a non-rotating member not shown via a one-way clutch 36 and a second intermediate member 38.

When the power of the engine is transmitted through the front cover 12 to the pump impeller 14 and the pump impeller 14 is rotationally driven, a fluid flow of the hydraulic oil in the torque converter 10 is generated, and the turbine runner 16 is rotated by the fluid flow so that the power is transmitted. While a speed ratio is small between the pump impeller 14 and the turbine runner 16, the flow of the hydraulic oil flowing out from the turbine runner 16 is changed in direction by the stator 35 and is sent into the pump impeller 14. As a result, the pump impeller 14 is rotated so that the torque is amplified. When the speed ratio becomes larger, contrarily, the stator 35 obstructs the flow of the hydraulic oil; however, in this case, the stator 35 idly rotates, so that the stator 35 is restrained from obstructing the flow of the hydraulic oil.

The lock-up clutch 18 is disposed between the front cover 12 and the clutch hub 32 in a power transmittable manner. The lock-up clutch 18 includes a lock-up piston 40 and a friction member 42 fixed to the outer circumferential side of the lock-up piston 40. The lock-up piston 40 is disposed at a position adjacent to the front cover 12 in the axis C direction. An inner circumferential end portion of the lock-up piston 40 is slidably fitted to an outer circumferential surface of a cylindrically-formed part of the clutch hub 32. Therefore, the lock-up piston 40 is relatively movable in the axis C direction with respect to the clutch hub 32. The friction member 42 is fixed to the outer circumferential side of the lock-up piston 40, specifically, at a position coming into contact with the front cover 12 when the lock-up piston 40 moves toward the front cover 12 in the axis C direction.

An outer circumferential portion of the lock-up piston 40 is coupled through a torsional damper 44 to the clutch hub 32 in a power transmittable manner. The torsional damper 44 is a well-known vibration reducing device including springs 45a, 45b and reducing a torque variation of the engine transmitted from the front cover 12 through the lock-up clutch 18. The outer circumferential portion of the lock-up piston 40 is formed in a cylindrical shape and has an end portion provided with multiple notches arranged in the circumferential direction. The torsional damper 44 has an outer circumferential end portion provided with protrusions fitted to the notches. Therefore, the lock-up piston 40 is relatively non-rotatable, and is relatively movable in the axis C direction, with respect to the torsional damper 44.

The lock-up clutch 18 moves in the axis C direction according to a pressure difference of a hydraulic pressure acting on both sides of the lock-up piston 40 in the axis C direction. For example, when the hydraulic pressure of the lock-up piston 40 on the front cover 12 side in the axis C direction is higher than the hydraulic pressure of the lock-up piston 40 on the torsional damper 44 side in the axis C direction, the lock-up piston 40 is moved in the axis C direction away from the front cover 12. In this case, the friction member 42 of the lock-up clutch 18 is not pressed against the front cover 12, so that the lock-up clutch 18 is released from the front cover 12.

On the other hand, when the hydraulic pressure of the lock-up piston 40 on the torsional damper 44 side in the axis C direction is higher than the hydraulic pressure on the front cover 12 side in the axis C direction, the lock-up piston 40 is moved toward the front cover 12 in the axis C direction. In this case, the friction member 42 of the lock-up clutch 18 is pressed against the front cover 12, so that the power input to the front cover 12 is partially or entirely transmitted through the lock-up clutch 18 and the torsional damper 44 to the clutch hub 32. The torque variation transmitted through the lock-up clutch 18 to the torsional damper 44 is absorbed by elastic deformation of the springs 45a, 45b of the torsional damper 44.

The torsional vibration reducing device 20 is disposed between the turbine runner 16 and the torsional damper 44 in the axis C direction. The torsional vibration reducing device 20 is disposed for reducing the torque variation of the engine transmitted through the lock-up clutch 18 disposed in the torque converter 10 or torsional vibration of a rotation shaft (the clutch hub 32 etc.). The torsional vibration reducing device 20 includes a disk-shaped plate 50 rotated around the axis C by receiving a torque, multiple rolling elements 46 swingably housed in roller chambers 48 described later formed in the plate 50, and a cover 52 housing the rolling elements 46 and the plate 50. The rolling elements 46, the plate 50, and the cover 52 are all made up of steel plates. The plate 50 corresponds to a rotating body of the present invention.

The cover 52 is made up of a first cover 54 and a second cover 56 which are facing each other in the axis C direction. An inner circumferential portion of the first cover 54 is fastened to the clutch hub 32 by the rivet 34.

The first cover 54 and the second cover 56 are joined to each other while housing the rolling elements 46 and the plate 50. The first cover 54 is formed in a disk shape and bulges in a direction away from the second cover 56 in a state of being joined to the second cover 56. The second cover 56 is formed in a disk shape and bulges in a direction away from the first cover 54 in a state of being joined to the first cover 54. Therefore, when the first cover 54 and the second cover 56 are joined each other, an annular space 62 surrounded by the first cover 54 and the second cover 56 is formed, and the plate 50 and the rolling elements 46 are housed in this space 62.

The first cover 54 and the second cover 56 are welded to each other at respective joint portions over the whole circumference. Therefore, the hydraulic oil is prevented from flowing into the space 62 surrounded by the first cover 54 and the second cover 56.

The plate 50 is formed in a disk shape and is arranged rotatably around the axis C. An inner circumferential end portion and an outer circumferential end portion of the plate 50 are respectively fixed to the first cover 54 and the second cover 56 such that both the inner and outer circumferential end portions are put between the first and second covers 54 and 56 in the axis C direction.

Figure 2:
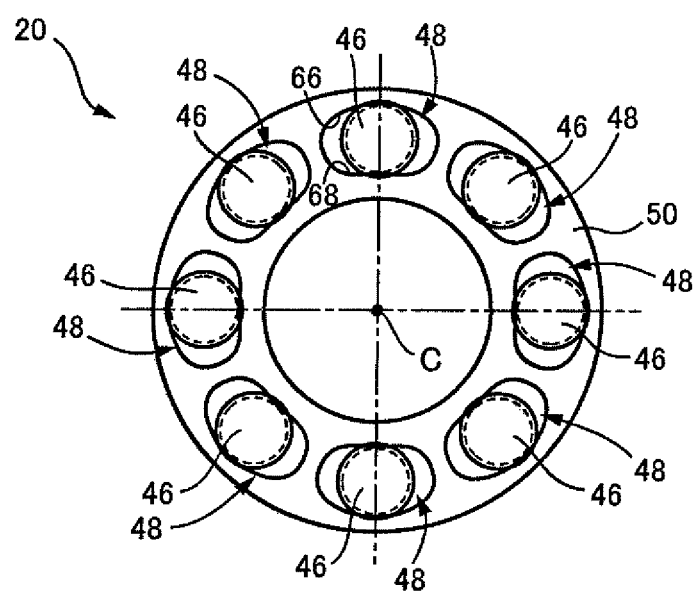
FIG. 2 is a view of rolling elements and a plate of FIG. 1 as viewed in the direction of an arrow A of FIG. 1.

FIG. 2 is a view of the rolling elements 46 and the plate 50 of FIG. 1 as viewed in the direction of an arrow A of FIG. 1. As shown in FIG. 2, multiple roller chambers 48 swingably housing the rolling elements 46 are formed in the plate 50 at equal angular intervals. The roller chambers 48 are spaces formed in an arc shape along a rotation direction of the plate 50, and the rolling elements 46 are housed in the spaces.

Each of the rolling elements 46 is a disk-shaped member having a thickness in the axis C direction larger than the plate 50 and has an annular groove 64 formed on an outer circumferential surface for fitting to a wall surface of the roller chamber 48. The annular groove 64 of the rolling element 46 is fitted to an inner wall surface 68 and an outer wall surface 66 of the roller chamber 48 located on the radially inner side of the plate 50 and the radially outer side of the plate 50, respectively, so that the rolling element 46 is swingable along the wall surface of the roller chamber 48 and is prevented from falling off from the roller chamber 48.

When the torque variation is transmitted to the torsional vibration reducing device 20, the rolling elements 46 housed in the roller chamber 48 swing along the outer wall surface 66 while being in contact due to a centrifugal force with the outer wall surface 66 of the roller chamber 48 located on the radially outer side of the plate 50, so that vibration (torsional vibration) attributable to the torque variation is reduced.

Figure 3:
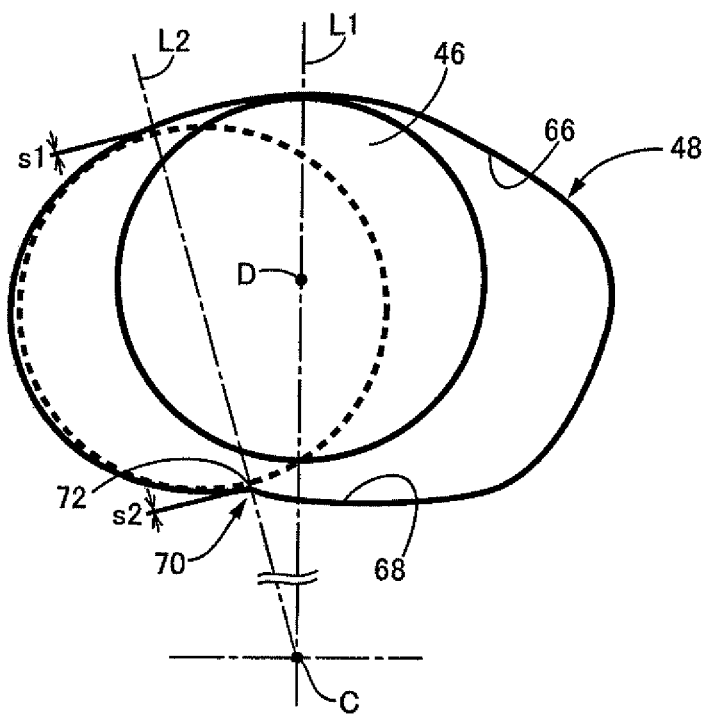
FIG. 3 is an enlarged view of a part where the rolling element is housed in a roller chamber of the plate in FIG. 2.

FIG. 3 is an enlarged view of a part where the rolling element 46 is housed in the roller chamber 48 of the plate 50 in FIG. 2. In FIG. 3, counterclockwise rotation around a rotation center C (same as the axis C) of the plate 50 corresponds to the rotation direction of the plate 50, and the rotation direction side of the plate 50 corresponds to the left side on the plane of the figure. In FIG. 3, the outer circumferential surface of the rolling element 46 in contact with the wall surface of the roller chamber 48 corresponds to an outer circumferential surface of the annular groove 64 formed on the outer circumferential surface of the rolling element 46 to be exact; however, the outer circumferential surface is described as the outer circumferential surface of the rolling element 46.

The rolling element 46 indicated by a solid line of FIG. 3 shows a state at the position where a center D thereof overlaps with a straight line L1 passing through the middle of the roller chamber 48 defined in terms of a circumferential direction (i.e., a swinging direction of the rolling element 46). The straight line L1 corresponds to a straight line passing through the rotation center C of the plate 50 and the center D of the rolling element 46 when the rolling element 46 is located in the middle between both end positions to which the rolling element 46 is swings within the roller chamber 48. In other words, the straight line L1 corresponds to a bisector bisecting an angle formed by intersection between a straight line passing through the center D of the rolling element 46 and the rotation center C of the plate 50 when the rolling element 46 is at an end portion on the rotation direction side of the plate 50 (the left end on the plane of FIG. 3) in the roller chamber 48 and a straight line passing through the center D of the rolling element 46 and the rotation center C of the plate 50 when the rolling element 46 is at an end portion on the side opposite to the rotation direction side of the plate 50 (the right side on the plane of FIG. 3) in the roller chamber 48.

A broken line shown in FIG. 3 shows a state in which the rolling element 46 is located at the end portion of the roller chamber 48 on the rotation direction side of the plate 50. As shown in FIG. 3, a protrusion 70 projecting radially outward of the plate 50 is formed on the inner wall surface 68 of the roller chamber 48 located on the radially inner side of the plate 50. The protrusion 70 is formed at a position, and in a shape, such that the protrusion 70 can come into contact with the outer circumferential surface of the rolling element 46 while the rolling element 46 is located at the end portion of the roller chamber 48 on the rotation direction side of the plate 50. Therefore, the protrusion 70 is formed hi a shape conforming to the outer circumferential shape of the rolling element 46. The wall surface of the roller chamber 48 is formed in a shape conforming to the outer circumferential shape of the rolling element 46 from an end portion on the rotation direction side of the plate 50 to a straight line L2 passing through the rotation center C of the plate 50 and a tip 72 of the protrusion 70. Therefore, when the rolling element 46 is moved to the end portion of the roller chamber 48 on the rotation direction side of the plate 50, the movement of the rolling element 46 is restricted.

While rotation speed of the plate 50 is equal to or greater than a predetermined value, the rolling element 46 is pressed against the outer wall surface 66 of the roller chamber 48 due to the centrifugal force; however, when the rotation speed of the plate 50 decreases, a pressing force of the rolling element 46 due to the centrifugal force becomes smaller so that the influence of gravity becomes dominant, and the rolling element 46 may separate from the outer wall surface 66 and collide with the inner wall surface 68 located on the radially inner side of the plate 50 as a portion of the wall surface forming the roller chamber 48, causing an abnormal noise. For example, when the engine is started or stopped, the centrifugal force becomes smaller during a transition period, so that the abnormal noise becomes a problem. When the engine is started, the abnormal noise is not noticeable due to operating noises of the engine etc.; however, when the engine is stopped, a time lag occurs due to inertia rotation, so that the abnormal noise occurs even after the engine sound disappears, and the abnormal noise tends to be noticeable.

To suppress the abnormal noise generated when the engine is stopped, as described above, the wall surface of the roller chamber 48 on the rotation direction side of the plate 50 is formed in a shape conforming to the outer circumferential shape of the rolling element 46 to the straight line L2 passing through the rotation center C of the plate 50 and the tip 72 of the protrusion 70. When the engine is stopped (during an engine stop transition period), as indicated by the broken line of FIG. 3, the rolling element 46 moves to the rotation direction side of the plate 50 in the roller chamber 48 due to inertia. Since the wall surface of the roller chamber 48 on the rotation direction side of the plate 50 is formed in a shape conforming to the outer circumferential shape of the rolling element 46 to the straight line L2 passing through the rotation center C of the plate 50 and the tip 72 of the protrusion 70, the movement of the rolling element 46 is restricted by the wall surface of the roller chamber 48. Therefore, when the engine is stopped, the rolling element 46 is restrained from colliding with the wall surface of the roller chamber 48, and the abnormal noise is prevented from occurring due to the collision between the rolling element 46 and the wall surface of the roller chamber 48.

As shown in FIG. 3, the protrusion 70 is formed on the rotation direction side of the plate 50 relative to the straight line L1 passing through the rotation center C of the plate 50 and the center D of the rolling element 46 when the rolling element 46 is located in the middle between both end positions to which the rolling element 46 swings within the roller chamber 48.

Figure 4:
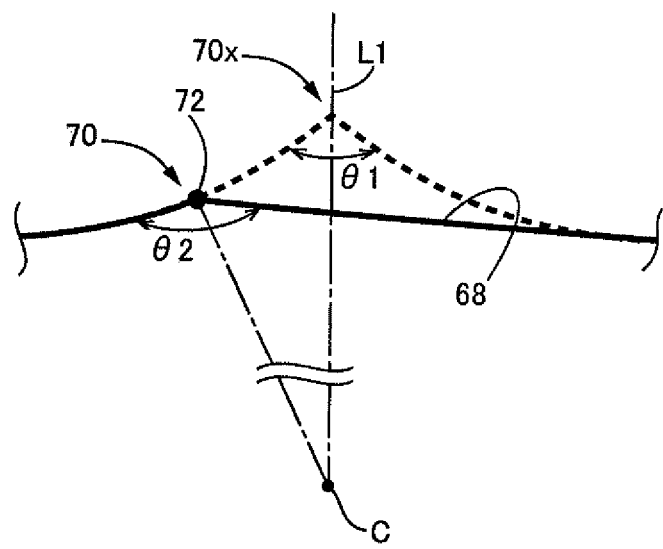
FIG. 4 is an enlarged view of the periphery of a protrusion of FIG. 3.

FIG. 4 is an enlarged view of the periphery of the protrusion 70 of FIG. 3. A solid line of FIG. 4 shows the shape of the protrusion 70 corresponding to this example, and a broken line shows a shape when a protrusion (described as a protrusion 70x for distinction) is formed on the straight line L1 for comparison. As shown in FIG. 4, both the protrusion 70 and the protrusion 70x are formed such that the wall surfaces thereof conforms to the outer diameter shape of the rolling element 46. When the protrusion 70 is formed on the rotation direction side of the plate 50 relative to the straight line L1, a distance between the protrusion 70 and the rotation center C of the plate 50 becomes shorter than a distance between the protrusion 70x and the rotation center C of the plate 50, and an angle $\theta 2$ (tip angle $\theta 2$) of the tip 72 of the protrusion 70 becomes larger than an angle $\theta 1$ (tip angle $\theta 1$) of the tip of the protrusion 70x ($\theta 2 > \theta 1$).

The protrusion 70 is subjected to a heat treatment for increasing the hardness at the time of manufacturing. The tip 72 of the protrusion 70 is pointed and therefore has a shape easily cracking during the heat treatment and making it difficult to ensure quality at the time of manufacturing. As the tip angle $\theta 2$ of the tip 72 of the protrusion 70 becomes smaller, the cracking is more likely to occur. In this regard, since the tip angle $\theta 2$ of the protrusion 70 is larger than the tip angle $\theta 1$ of the protrusion 70x formed on the straight line L1, the occurrence of cracking of the protrusion 70 during the heat treatment of the protrusion 70 is reduced as compared to the protrusion 70x. Therefore, the quality is improved at the time of manufacturing of the plate 50.

In this example, the wall surface of the roller chamber 48 on the rotation direction side of the plate 50 is formed in a shape conforming to the outer circumferential shape of the rolling element 46 to the straight line L2 passing through the rotation center C of the plate 50 and the tip 72 of the protrusion 70, and while the rolling element 46 is located at the end portion of the roller chamber 48 on the rotation direction side of the plate 50, the rolling element 46 is in contact with the inner wall surface 68 and the outer wall surface 66 of the roller chamber 48 located on the straight line L2 passing through the rotation center C of the plate 50 and the tip 72 of the protrusion 70; however, while the rolling element 46 is located at the end portion of the roller chamber 48 on the rotation direction side of the plate 50, a gap S equal to or less than a predetermined value α may exist from the rolling element 46 to the inner wall surface 68 and the outer wall surface 66 of the roller chamber 48 located on the straight line L2 passing through the rotation center C of the plate 50 and the tip 72 of the protrusion 70. This configuration restricts an amount of movement of the rolling element 46 to the predetermined value α or less when the engine is stopped. The inner wall surface 68 of the roller chamber 48 located on the straight line L2 corresponds to the wall surface forming the protrusion 70. The gap corresponds to the sum of s1 and s2 (=s1+s2) of FIG. 3, although the gap S is zero or substantially zero in this example.

The predetermined value α is obtained experimentally or through design in advance and is set to a value within a range in which a driver does not perceive the abnormal noise occurring when the rolling element 46 moves through the gap S between the rolling element 46 and the wall surface of the roller chamber 48 and collides with the wall surface of the roller chamber 48. As the predetermined value α decreases, the abnormal noise becomes smaller. In the engine stop transition period, as engine rotation speed becomes lower, the rotation speed of the plate 50 also becomes lower, so that the centrifugal force decreases. In this case, since the gap S between the wall surface forming the protrusion 70 and the rolling element 46 is equal to or less than the predetermined value α, even if the centrifugal force decreases and the rolling element 46 separates from the outer wall surface 66, the amount of movement of the rolling element 46 is restricted to the predetermined value α or less. Therefore, the driver does not perceive the abnormal noise caused by collision of the rolling element 46 with the wall surface of the roller chamber 48, so that the abnormal noise is substantially suppressed.

Preferably, the predetermined value α is zero or substantially zero. Such setting brings the rolling element 46 into contact with the inner wall surface 68 and the outer wall surface 66 of the roller chamber 48 located on the straight line L2 passing through the rotation center C of the plate 50 and the tip 72 of the protrusion 70 while the rolling element 46 is located at the end portion of the roller chamber 48 on the rotation direction side of the plate 50. Therefore, the amount of movement of the rolling element 46 becomes zero or substantially zero when the engine is stopped, so that the rolling element 46 is prevented from colliding with the wall surface of the roller chamber 48 when the engine is stopped.

As described above, according to this example, the wall surface of the roller chamber 48 on the rotation direction side of the plate 50 is formed in a shape conforming to the outer circumferential shape of the rolling element 46 to the straight line L2 passing through the rotation center C of the plate 50 and the tip 72 of the protrusion 70, and therefore, while the rolling element 46 is in contact with the wall surface on the rotation direction side of the plate 50, the movement of the rolling element 46 is restricted so that the abnormal noise is prevented from occurring due to the collision between the rolling element 46 and the wall surface of the roller chamber 48.

According to this example, the protrusion 70 is formed on the rotation direction side of the plate 50 relative to the straight line L1 passing through the rotation center C of the plate 50 and the center D of the rolling element 46 when the rolling element 46 is located in the middle between both end positions to which the rolling element 46 swings within the roller chamber 48, and therefore, the tip angle 82 of the protrusion 70 can be made larger as compared to when the protrusion 70 is on the straight line L1. Therefore, the occurrence of cracking of the protrusion 70 can be reduced during the heat treatment applied for increasing the hardness of the protrusion 70 when the plate 50 is manufactured. As a result, the quality is improved at the time of manufacturing of the plate 50.

Although the example of the present invention has been described in detail reference to the drawings, the present invention is also applied in other forms.

For example, although the wall surface of the roller chamber 48 on the rotation direction side of the plate 50 is formed in a shape conforming to the outer circumferential shape of the rolling element 46 in the example described above, the wall surface of the roller chamber 48 on the rotation direction side of the plate 50 may not necessarily entirely be conform to the outer circumferential shape of the rolling element 46, and a portion of the wall surface may not conform to the outer circumferential shape of the rolling element 46. In short, the shape of the rolling element 46 is not strictly limited as long as the movement thereof can be restricted.

The above description is merely an embodiment and the present invention can be implemented in variously modified and improved forms based on the knowledge of those skilled in the art.

REFERENCE SIGNS LIST

20: Torsional vibration reducing device
46: Rolling element
48: Roller chamber
50: Plate (Rotating body)
70: Protrusion
72: Tip

What is claimed is:

1. A torsional vibration reducing device comprising: a rotating body rotated by receiving a torque; a roller chamber formed in the rotating body and formed in a circular arc shape along a rotation direction of the rotating body; and a rolling element swingably housed in the roller chamber such that the rolling element can swing between two end positions within the roller chamber including an end position of the roller chamber on a rotation direction side of the rotating body which is the position of the rolling element when the rolling element abuts a rotation-direction-most surface of the roller chamber, wherein a protrusion projecting radially outward of the rotating body is formed on an inner wall surface, which is a portion of a wall surface forming the roller chamber located on a radially inner side of the rotating body, wherein a tip of the protrusion is formed on the rotating body between a rotation center of the rotating body and a center of the rolling element when the rolling element is located at the end position of the roller chamber on the rotation direction side of the rotating body, and wherein while the rolling element is located at the end position of the roller chamber on the rotation direction side of the rotating body, a gap equal to or less than a predetermined value is between the rolling element and the wall surface of the roller chamber on a straight line passing through the rotation center of the rotating body and a tip of the protrusion.

2. The torsional vibration reducing device according to claim 1, wherein the wall surface of the roller chamber is formed in a shape conforming to an outer circumferential shape of the rolling element from the end position on the rotation direction side of the rotating body to the straight line passing through the rotation center of the rotating body and the tip of the protrusion.

3. The torsional vibration reducing device according to claim 1, wherein the protrusion is subjected to a heat treatment.

4. The torsional vibration reducing device according to claim 2, wherein the protrusion is subjected to a heat treatment.

* * * * *